L. N. TREMBLAY.
CUTTING OFF MACHINE FOR TRUNK TIMBER.
APPLICATION FILED SEPT. 26, 1918.
1,301,337.
Patented Apr. 22, 1919.
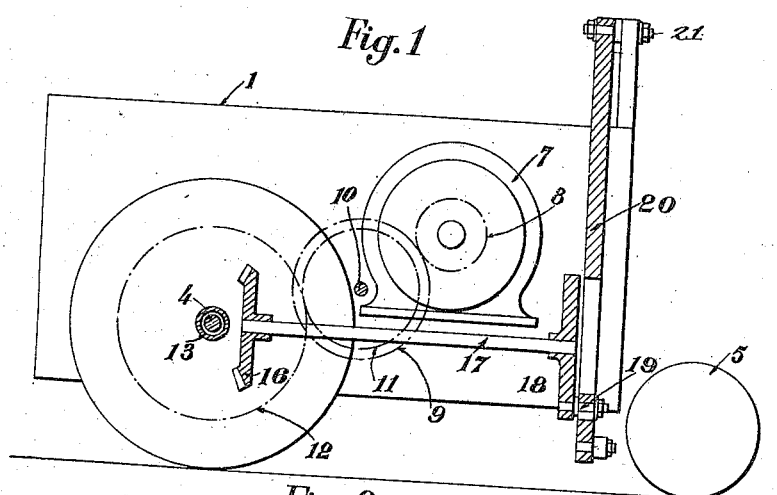
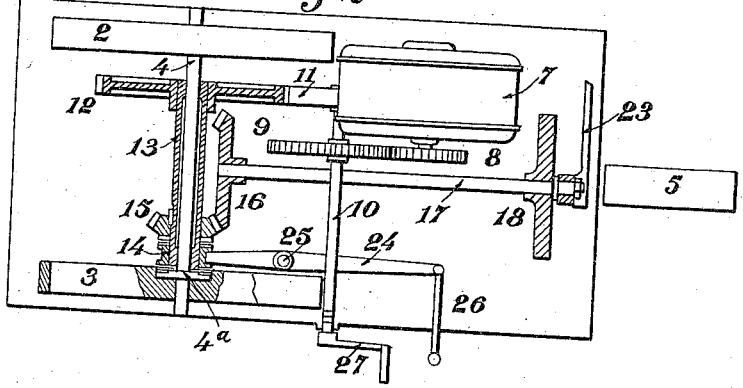
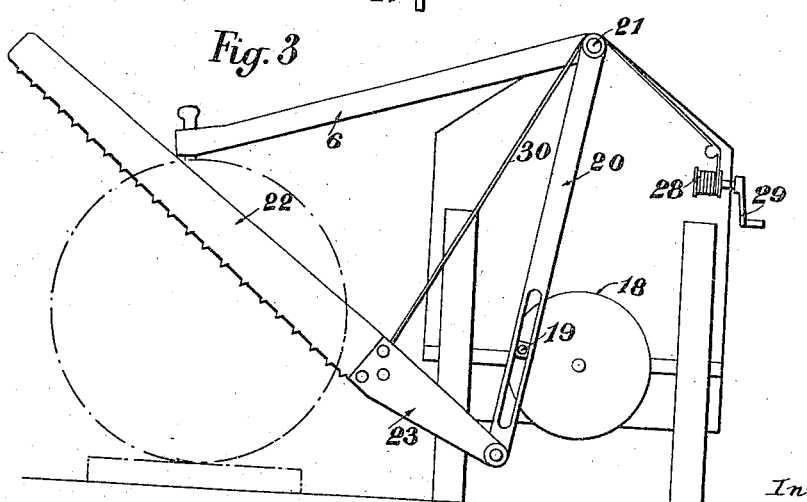
Inventor
L. N. Tremblay
By H. R. Kerslake
Atty

UNITED STATES PATENT OFFICE.

LOUIS NARCISSE TREMBLAY, OF PARIS, FRANCE.

CUTTING-OFF MACHINE FOR TRUNK TIMBER.

1,301,337. Specification of Letters Patent. Patented Apr. 22, 1919.

Application filed September 26, 1918. Serial No. 255,843.

*To all whom it may concern:*

Be it known that I, LOUIS NARCISSE TREMBLAY, citizen of the Republic of France, residing at 128 Rue Lecourbe, Paris, Seine, in the Republic of France, have invented new and useful Improvements in Cutting-Off Machines for Trunk Timber, of which the following is a specification.

This invention relates to improvements in mechanism for operating cross-cut saws for cutting logs, timbers, or the like into lengths while the wood to be operated upon is in horizontal position, an object being to provide a saw mechanism of simple construction, that may be operated by any suitable motor.

A further object of the invention is to provide a motor-driven saw mechanism which may be transported under the power of its own motor, so that the saw may be expeditiously moved from one location to another.

With the foregoing objects outlined and with other objects in view, the invention consists in the novel features hereinafter described with reference to the accompanying drawings, and more particularly pointed out in the appended claims.

In the annexed drawing:

Figure 1 is a vertical longitudinal section of the improved machine.

Fig. 2 is a plan view, the driving mechanism being shown in section.

Fig. 3 is an end view showing the supporting and driving means for the saw blade.

In the drawing, the frame and supporting wheels are shown diagrammatically.

As shown in the drawing the machine is provided with a casing or frame 1 carried on three wheels, one of the rear wheels, which is shown at 3 is preferably fixed to the driving axle 4 by which it is rotated and the other rear wheel 2 is loosely carried on the said axle so that the machine can take short curves without inconvenience, The front wheel 5 is a steering wheel. When the machine is stationary and in operation, the rear wheels are locked by any suitable means (not shown) and the machine is further steadied in position by means of a lever arm 6 (Fig. 3) pivotally mounted on the fulcrum 21 and provided with a spike which is driven into the tree trunk to be cut off.

A motor 7 mounted in the casing 1 is used to drive, through the medium of gear wheels 8 and 9, a cross shaft 10 carrying a gear wheel 11, which is in mesh with a gear wheel 12 fixed to a hollow shaft 13 surrounding the axle 4. A clutch sleeve 14 splined on the hollow shaft 13 may be engaged either with a bevel gear 15 loosely mounted on the shaft 13 or with a face plate 4ª secured on the axle 4. The clutch sleeve 14 is operated by means of a two arm lever 24 pivoted at 25 on the casing and actuated by means of the handle 26. In the position of the parts as shown in Fig. 2, the clutch sleeve 14 occupies a middle or idle position and the machine is at rest even if the motor is working. The bevel gear 15 is in mesh with a bevel wheel 16 keyed on a longitudinal shaft carrying at one end a crank plate 18, the crank pin 19 of which drives a link or beam 20 pivotally mounted on the fulcrum 21. The link 20 actuates the saw blade holder 23 carrying the saw blade 22.

The link 20 and saw blade 22 move in planes at right angles to the longitudinal axis of the machine and the blade and link are located at a point intermediate the rear axle and front wheel, so that the momentum forces developed by the alternating movements of the saw have no tendency to move the machine forward or rearward. A driving handle or crank 27, which may be clutched to the cross shaft 10, affords a manual means for duplicating the action of the motor. It is especially used for the purpose of adjusting with precision the position of the saw blade or the position of the whole machine with respect to the tree.

A small hand winch 28 (Fig. 3) with handle 29 mounted on the side of the casing 1, permits the saw to be lifted when the cutting-off operation is over. The cable 30 of said winch passes over the fulcrum 21 and acts also to limit the downward movement of the saw blade and prevent the same from dropping upon the ground when the operation is finished.

The operation of the machine is as follows: for transportation purposes, the lever arm 6 is lowered and the saw blade 22 is lifted whereby the whole machine takes the minimum floor space. The clutch sleeve 14 being disengaged, the motor is started and the handle 26 is then pushed inwardly so that the machine is propelled, steering being provided by means of the front wheel 5. When the desired place is reached, the motor is stopped and, by means of the handle or crank 27, the machine is brought to the exact position desired with respect to the cut to be made. The wheels 2 and 3 are then locked, the lever 6 is lowered and the free end of the same is fixed to the tree. The lever 26 is then pulled out to engage the clutch with the pinion 15 and the motor is started, the saw blade is left free by suitable slackening the cable 30 of the winch, the weight of the blade being sufficient for cutting even the hardest kinds of woods. When the cutting off operation is ended, the motor is stopped, the clutch is disengaged, the saw blade is lifted by means of the winch and the lever arm 6 is disengaged from the tree. The machine is then ready for a further operation.

Having now described my invention what I claim as new and desire to secure by Letters Patent is:

1. In a sawing machine, a fulcrum, a saw-supporting link pivotally carried by said fulcrum, a saw movable with said link, a lever arm pivotally mounted on said fulcrum and carrying a means for securing the lever to the log to be sawed, a winch, and a cable passing over said fulcrum and having one of its ends connected to the saw and its other end connected to said winch.

2. In a portable sawing machine, the combination with a driven wheel supported axle and a saw actuating shaft, of a sleeve loosely mounted on said axle, a gear fixed to the sleeve, a motor operatively connected to said fixed gear, a gear loosely mounted on said sleeve, a gear connecting the last named gear to the saw actuating shaft, a face plate fixed to said axle, and a clutch sleeve splined on said sleeve and adapted to engage the fixed gear or face plate for driving either the axle or saw actuating shaft.

In testimony whereof I have signed my name to this specification in the presence of two subscribing witnesses.

LOUIS NARCISSE TREMBLAY.

Witnesses:
 LOUIS MOSÈS,
 JOHN F. SIMONS.

Copies of this patent may be obtained for five cents each, by addressing the "Commissioner of Patents, Washington, D. C."